(12) United States Patent
Trevethick

(10) Patent No.: US 7,717,997 B2
(45) Date of Patent: May 18, 2010

(54) INTEGRAL WATER RESISTANT FIBRE-CEMENT

(75) Inventor: Simon Trevethick, Whitianga (NZ)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 12/270,407

(22) Filed: Nov. 13, 2008

(65) Prior Publication Data

US 2009/0155478 A1 Jun. 18, 2009

Related U.S. Application Data

(62) Division of application No. 10/474,800, filed as application No. PCT/AU02/00449 on Apr. 9, 2002, now Pat. No. 7,455,727.

(30) Foreign Application Priority Data

Apr. 9, 2001 (NZ) .................................. 511013

(51) Int. Cl.
*C04B 24/24* (2006.01)
(52) U.S. Cl. .................. 106/644; 106/2; 106/724; 106/823; 427/421.1; 427/427.4; 427/427.6; 264/333; 156/39
(58) Field of Classification Search .................. 106/644, 106/2, 724, 823; 427/421.1, 427.4, 427.6; 264/333; 156/39
See application file for complete search history.

(56) References Cited

U.S. PATENT DOCUMENTS

| 4,386,134 | A | 5/1983 | Puhringer |
| 4,536,534 | A | 8/1985 | Singer et al. |
| 4,689,476 | A | 8/1987 | Katz |
| 4,801,630 | A | 1/1989 | Chow et al. |
| 4,973,510 | A | 11/1990 | Tanaka |
| 5,418,006 | A | 5/1995 | Roth et al. |
| 5,443,627 | A | 8/1995 | Von Au et al. |
| 5,702,828 | A | 12/1997 | Adler et al. |
| 5,776,245 | A | 7/1998 | Thomas |
| 5,791,109 | A | 8/1998 | Lehnert et al. |
| 5,855,667 | A | 1/1999 | Thomas |
| 6,294,608 | B1 | 9/2001 | Hager et al. |
| 6,676,745 | B2 | 1/2004 | Merkley et al. |
| 6,941,720 | B2 | 9/2005 | DeFord et al. |

(Continued)

FOREIGN PATENT DOCUMENTS

CL 38828 5/1991

(Continued)

OTHER PUBLICATIONS

Boer, KE, "Modification of gypsum based mortar by Vinnapas dispersing emulsoid powder," Huaxue Jiancai (1999), 15(6):41-42.

(Continued)

*Primary Examiner*—Paul Marcantoni
(74) *Attorney, Agent, or Firm*—Gardere Wynne Sewell LLP

(57) ABSTRACT

A method of producing a water resistant fiber-cement product. The water repelling agent can be added or applied to the fiber-cement or indeed the material forming the fiber cement at a number of different stages in the process. The resultant material has increased water impermeability over conventional fiber-cement products.

8 Claims, 2 Drawing Sheets

U.S. PATENT DOCUMENTS

| | | | |
|---|---|---|---|
| 6,955,844 B2 | 10/2005 | Tagge et al. | |
| 7,455,727 B2 | 11/2008 | Trevethick | |

FOREIGN PATENT DOCUMENTS

| | | |
|---|---|---|
| CL | 01701997 | 1/1997 |
| CL | 247498 | 8/1999 |
| DE | 2856079 A1 | 7/1979 |
| DE | 3418000 A1 | 11/1985 |
| DE | 19939866 A1 | 3/2001 |
| EP | 1035088 A1 | 9/2000 |
| EP | 1044939 A1 | 10/2000 |
| GB | 2011520 | 7/1979 |
| HU | 173506 B | 5/1979 |
| HU | 220242 A2 | 7/1998 |
| JP | 59128261 A | 7/1984 |
| JP | 06157758 A | 6/1994 |
| JP | 08337460 A | 12/1996 |
| JP | 2000290460 A | 10/2000 |
| TW | 131023 | 3/1990 |
| WO | WO-8404765 | 12/1984 |
| WO | WO-9928275 A1 | 6/1999 |
| WO | WO-0063294 A1 | 10/2000 |
| WO | WO-02081399 A1 | 10/2002 |

OTHER PUBLICATIONS

Schulze, J. et al., "Long-term performance of redispersible powders in mortars," Cement and Concrete Research (2001), 31: 357-362.

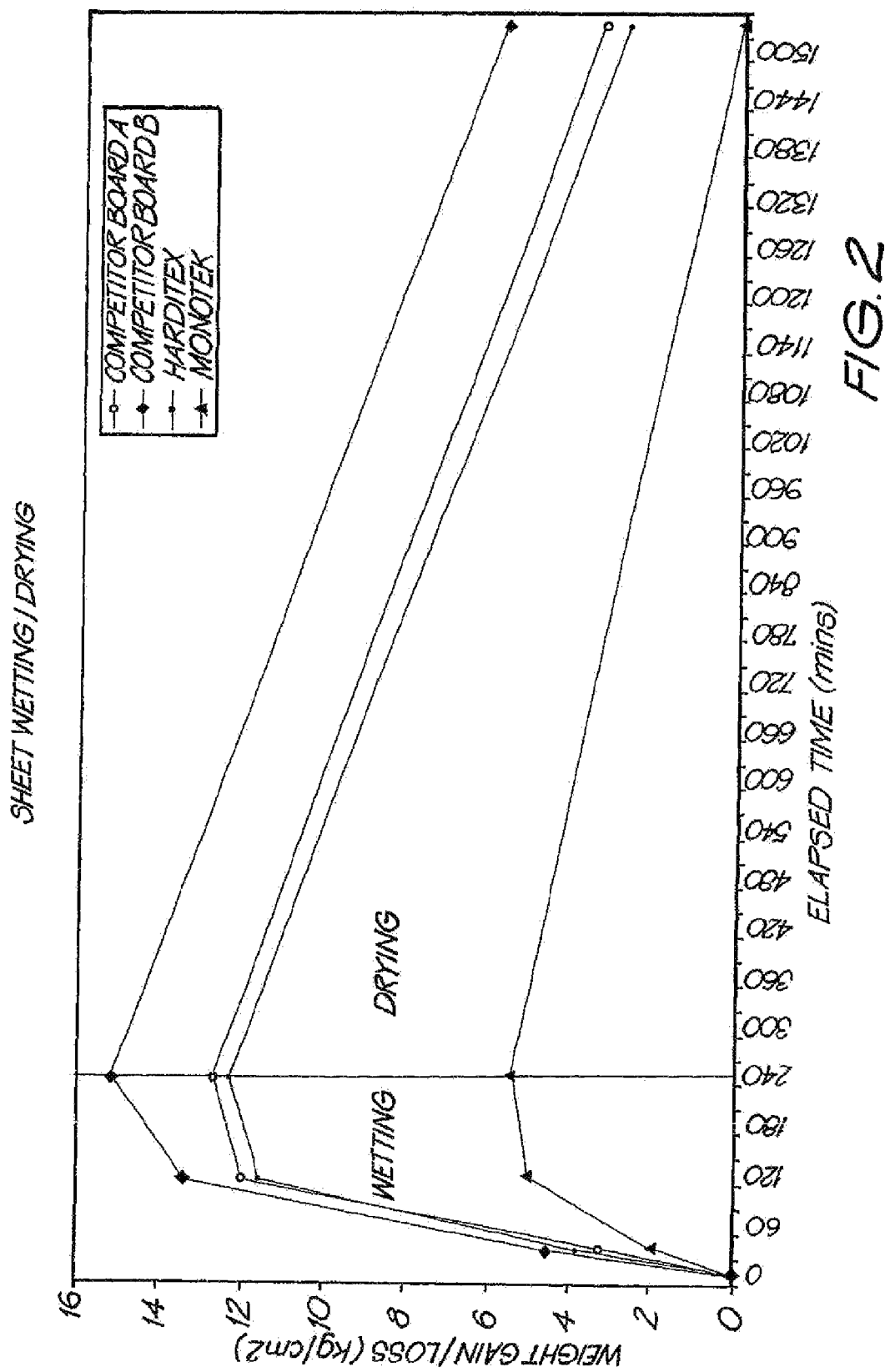

INTEGRAL WATER RESISTANT FIBRE-CEMENT

FIELD OF THE INVENTION

This particular invention relates to a water resistant cement. More particularly the invention relates to the preparation and use of a water resistant fibre-cement product to produce fibre-cement board cladding, tiles and/or panels.

BACKGROUND TO THE INVENTION

Fibre-cement products which may include board tiles and/or panels are commonly used in the building industry in the manufacture of sidings, exterior cladding, skirting and interior panels, and many other interior construction materials. In the industry, fibre-cement board may also be known as "fibreboard".

The problem with fibre-cement products is that if water enters the product (eg a wall panel) before installation, the panel will expand slightly and, if installed, stress will build up in the panel as it dries that can lead to bowing and like problems. Thus it is clearly desirable that the fibre-cement product be water-resistant or water repelling to combat such problems.

The difficulty in producing water resistant fibre-cement products has been primarily due to the harsh conditions used during the preparation of the fibre-cement product. To increase its flexural strength, fibre-cement products are normally cured in an autoclave. The saturated steam pressure used is usually about 1000 KPa. The pressure is held at this level for approximately 8 hours, and the alkalinity of the board may be as high as a pH of 13. These harsh conditions affect the molecular integrity of the organic polymers used and this prevents the formation of water resistant fibre-cement.

Whilst many different hydrophobic polymers have been successful at waterproofing building materials, such as gypsum, they have failed to impart water resistance on fibre-cement products primarily due to the problems of the autoclaving process used for fibre-cement production:

In this specification, the relationship between a water repelling agent and fibre-cement is described by the term "integrally associated". This term is understood to describe the substantially even spread or distribution of a water repelling agent throughout the fibre-cement.

OBJECT OF THE INVENTION

It is an object of the present invention to overcome or ameliorate the disadvantages of known fibre-cement products, or to at least provide the public with a useful alternative.

Other objects of the invention may become apparent from the following description which is given by way of example only.

SUMMARY OF THE INVENTION

According to one aspect of this invention there is provided a method of producing a water resistant fibre-cement product, the method including combining a water repelling agent with a fibre-cement material; forming a fibre-cement product from the combination, whereby the water repelling agent is integrally associated with the fibre-cement.

Preferably, the water repelling agent is a long chain terpolymer derived from ethylene, vinyl chloride, and/or vinyl laurate.

Preferably the terpolymer includes silane based functional groups.

In one preferred form the water repelling agent is added to the fibre-cement as a dispersion and/or emulsion.

Preferably, the dispersion and/or emulsion includes the water repelling agent suspended water, or in an alkaline solution such as lime water.

Preferably, the water resistant fibre-cement product is a water resistant fibre-cement board tile, panel, and/or exterior cladding material.

Preferably the method includes the step of autoclaving the fibre-cement product.

According to a further aspect of this invention there is provided a water resistant fibre-cement, wherein the fibre-cement includes a water repelling agent that is integrally associated with the fibre-cement.

Preferably, the water repelling agent is a long chain terpolymer derived from ethylene, vinyl chloride, or vinyl laurate.

Preferably the terpolymer includes silane based functional groups.

Preferably, the water repelling agent is in a proportion of substantially 0.5% to 10%, by weight of the total materials used to produce the fibre-cement.

In one preferred form the water repelling agent is in a proportion of substantially 1%, by weight of the total materials used to produce the fibre-cement.

In another preferred form the water repelling agent is in a proportion of substantially 7% by weight of the total materials used to produce the fibre-cement.

Preferably, the water resistant quality of the product is not reduced by autoclaving.

Preferably, the product may be a tile, panel and/or exterior cladding material.

In a further aspect the invention produces a process for producing a water-resistant fibre-cement product, the method including using a terpolymer derived from ethylene, vinyl chloride, or vinyl laurate, in forming a fibre cement product wherein the terpolymer is integrally associated with the fibre-cement, and autoclaving the product.

Preferably the autoclaving process includes the use of saturated steam at pressure, in an alkaline environment.

Preferably the saturated steam is at a pressure of about 1000 KPa.

Preferably the alkaline environment is up to about pH 13.

Preferably the terpolymer is sprayed on to the fibre-cement during formation of the fibre-cement.

In a final aspect the invention relates to a water-resistant fibre cement board produced by any-one of the above processes.

Other aspects of the invention will become apparent from the following description which is given by example only and with reference to the drawing.

BRIEF DESCRIPTION OF THE DRAWING

The invention will now be described by way of example only and with reference to the drawing in which:

FIG. 2: is a comparison of a water resistant board according the invention (Monotek) in comparison with other comparable available fibreboard products.

DETAILED DESCRIPTION OF THE INVENTION

Figure 1:
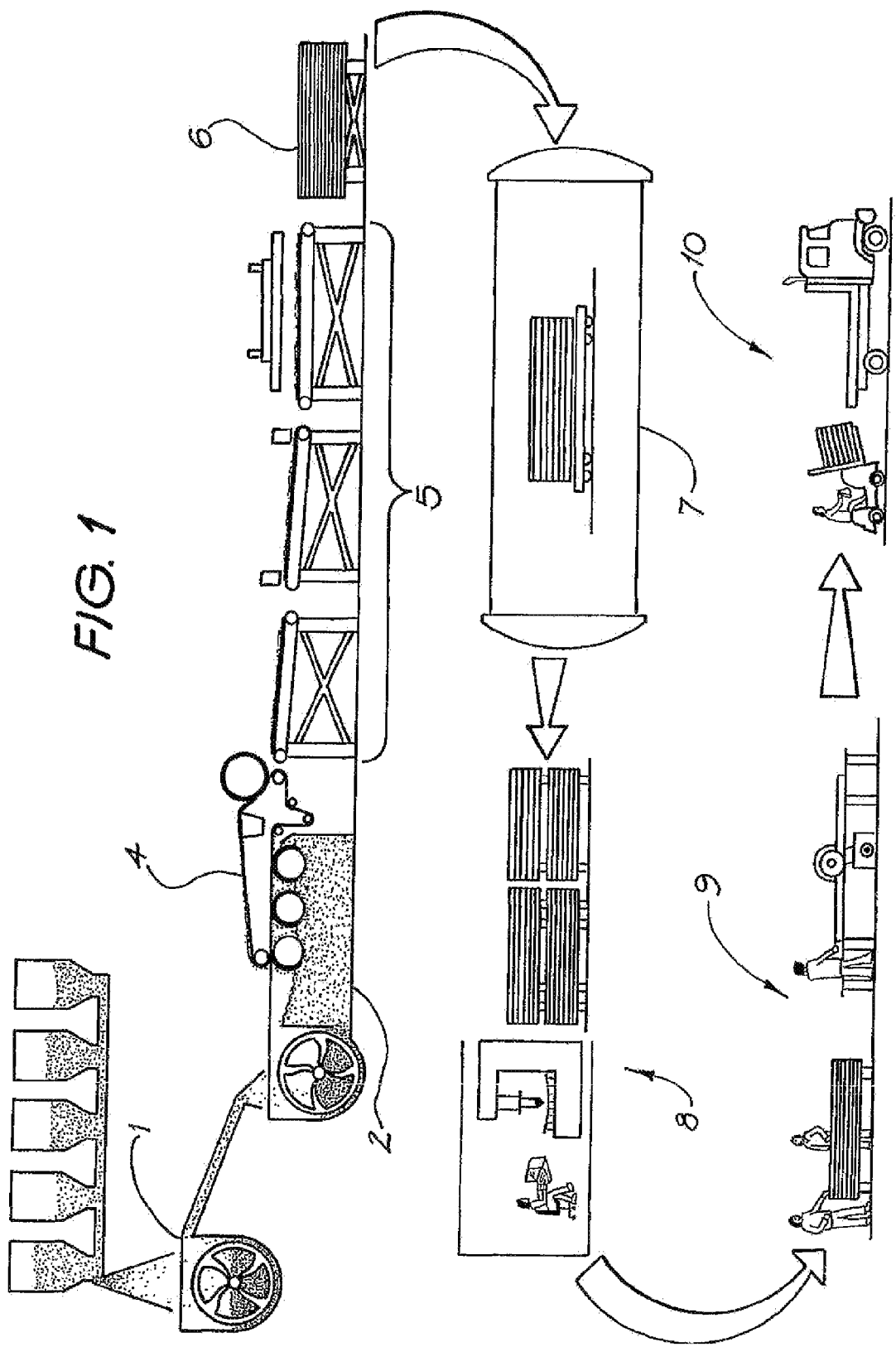
FIG. 1: is a schematic flowchart of a process for the preparation of fibre-cement board tiles and/or panels according to the invention.

The invention described herein relates to water resistant fibre-cement and/or water resistant fibre-cement products. The invention also relates to a process for preparing water resistant fibre-cement and its use to produce water resistant fibre-cement products.

Water resistant fibre-cement products are used in a wide range of building and construction material, such as exterior and interior claddings, panels and/or tiles, planks, building boards and the like. It will be understood that the term "water resistant fibre-cement product" is used in a general sense herein and is not limited to a specific construction or building material.

The water resistant fibre-cement product is constructed, including water repelling agent and fibre-cement.

The fibre-cement is composed from fibre, binder and other additives as will be known in the art. The fibre-cement provides the product with strength and stability by retaining the product in the desired form.

The water repelling agent is in a proportion of about 0.5 wgt % to 10 wgt %. The proportion of the water repelling agent may be varied in accordance with the specific use for a water resistant fibre-cement product. For example, a fibre-cement product for use as an interior surface in wet areas, such as a kitchen, will preferably include about 0.5 to 2 wgt % of the water repelling agent.

A fibre-cement product for use as an exterior cladding or in a wet wall area may include between about 0.5 and 2% preferably 1 wgt % of the water repelling agent. Alternatively where a water resistant fibre-cement product is intended to be used as a roofing product, a higher proportion, between about 2-10%, preferably about 7 wgt %, of the water repelling agent is used.

Where a water resistant fibre-cement product is to be used as an exterior tile or panel, it is also desirable to include a high proportion of the water repelling agent. This may also range from 2 wgt % to 10 wgt %. Thus, the proportion of a water repelling agent included in the water resistant fibre-cement product may be tailored to the specific end use of a water resistant fibre-cement product.

A water resistant fibre-cement product may be prepared for a general or all purpose application. In this case the quantity of the water repelling agent is not dictated by the final use for the water resistant fibre-cement product. Thus, the quantity of water repelling agent in an all purpose water resistant fibre-cement product is preferably in the range of about 2 wgt % to 10 wgt % preferably between about 4 and 7 wgt %.

The water repelling agent will be integrally associated with the fibre-cement in the water resistant fibre-cement product. Thus, the water repelling agent will be dispersed evenly throughout the water resistant fibre-cement product. This means the product as a whole is resistant and surface damage will not affect performance.

A further aspect of this invention includes the specific selection of unique water repelling agents for the production of a water resistant fibre-cement. The selection of a particular water repelling agent to produce a water resistant fibre-cement may be dictated by a number of factors including the stability of the water repelling agent during the manufacture of water resistant fibre-cement and the subsequent manufacture of the water-resistant fibre cement product; the stability of the water repelling agent's water repelling properties in the water resistant fibre-cement product; and the long term stability of the water repelling agent in a water resistant fibre-cement product.

The water repelling agent should also be stable in the presence of solvent based paints and/or residues which may be applied to the water resistant fibre-cement product. In this preferred form, the water resistant fibre-cement product should be capable of being subsequently coated with a range of solvents and water borne paints, and/or textured coatings. Therefore, the water repelling agent should be stable and substantially retain molecular integrity and/or avoid decomposition after the application of paint coatings (or the like) to the water resistant fibre-cement product. Alternatively the water repelling agent should preferably retain water repelling qualities after the application of paint or solvent based coatings.

It has been surprisingly found that certain hydrophobic terpolymers derived from ethylene, vinyl chloride, and/or vinyl laurate are able to maintain water-resistant capability of the product can after autoclaving to increase product strength. The terpolymers will, in a preferred form also include silane (silicon) functional groups. Such compounds produce a product that withstands the fibre-cement production process and retains the water repelling properties product. This is particularly surprising due to the harsh nature of the autoclaving process used to increase the strength of fibre-cement products (as discussed elsewhere herein). One particular product of use is Vinnapas RI 554Z available from Waker Polymer.

A further aspect of the invention includes a method of producing a water resistant fibre-cement which may be used to prepare water resistant fibre-cement products.

Water resistant fibre-cement and products thereof are produced through a number of steps. FIG. 1 illustrates the preferred preparation of water resistant fibre-cement products. It will however be appreciated that there may be a number of different ways to prepare fibre-cement and the basic process described by FIG. 1 is known to produce fibre-cement products. The description given below with reference to the FIG. 1 merely describes a preferred method of preparing water resistant fibre-cement and water-resistant fibre cement products.

With reference to FIG. 1, the initial water and fibre-cement making materials are mixed together in and by a mixing means 1. The materials may include fibre, binder, silica and additional components being included to optimise performance as are known in the art.

The water repelling agent can be added or applied to the fibre-cement (or material for forming the fibre-cement) at a number of different stages in the process.

In one preferred form, as shown in FIG. 1, the water repelling agent is added to the mixing means 1 during the mixing step of the fibre-cement making materials. In this form the water repelling agent may be added in a number of ways. The water repelling agent may be added as an emulsion and/or as an aqueous alkaline solution. A powder of the water repelling agent may be pre-mixed with lime water or just water to form the emulsion/solution before it is added to the mixing means 1. Preferably the mixing time will be about 4 minutes.

Alternatively, the water repelling agent may be added as a ground powder. In this way the powder is added to the mixing means 1, during the mixing of the fibre-cement making materials along with the other components.

The way in which the water repelling agent is added to the fibre-cement making materials may also include pouring the water repelling agent, in one or more portions into the mixing means 1 either before or after mixing has commenced. Adding the water repelling agents at this stage also assists in providing an even distribution of water repelling agents throughout the fibre-cement.

A slurry is produced from the initial mixing step in mixing means 1 which is then drained into a buffer tank 2. In an alternative form, the water repelling agent could also be added to the slurry in buffer tank 2 in one or more portions and mixed into the slurry.

Rotating sieves 3, housed within buffer tank 2, are suspended partially within the slurry in buffer tank 2 and accumulate slurry material or fibre-cement on the sieves. The fibre-cement forms a thin layer and/or crust around the outer surface of the rotating sieve 3. The rotating sieve 3 moves in the same direction to the rotating felt 4 with the result that the fibre-cement on the sieve 3 accumulates on the rotating felt 4.

In a further preferred form, instead of buffer the water repelling agent with the fibre-cement components, the water repelling agent may be sprayed onto the moving accumulated fibre-cement which forms on the rotating sieves 3 or rotating felt 4. In this preferred form, an aqueous dispersion of the water repelling agent is sprayed onto the newly accumulated fibre-cement while the rotating sieves 3 and rotating felt 4 are rotating. Once the water repelling agent is sprayed on to the accumulated fibre-cement, the water repelling agent seeps into the fibre-cement to become integrally associated with the fibre-cement.

The use of a spray to apply the water repelling agent also provides a convenient way of varying the amount of water repelling agent applied to the fibre-cement A running speed of a spray delivery system may be tailored for operation with the rotating sieve 3 and rotating felt 4 so that the desired quantity of water repelling agent is applied to the fibre-cement. It is also envisaged that the spray delivery system may be adapted so that the quantity of water repelling agent applied to the fibre-cement may be varied.

The rotating felt 4 transports accumulated water resistant fibre cement, from the buffer tank 2 to the sheet machine 5. At the sheet machine 5 excess water drains from the water resistant fibre-cement. A vacuum box may be used to facilitate this. The water resistant fibre-cement presented by the rotating felt 4 is pressed and/or cut by a cutting machine 5 into an appropriate form for the desired use of the water resistant fibre-cement product. The cutting machine 5 may be adjusted so that the water-resistant fibre cement product formed may be panels, tiles and/or boards accordingly. It will be appreciated that the circumference of the rotating sieve 3 dictates the length of the panels presented by rotating felt 4.

The water resistant fibre-cement product, or green product, produced from the sheet machine 5 is then pre-cured at 6 which improves the green strength of the product so that it can endure the autoclaving.

Following the pre-curing treatment 6 the panels are then autoclaved in autoclave 7 to increase the strength (eg flexural strength) of the product. The autoclaving process 7 is conducted at a specific ratio of time to temperature, so that any growth of calcium silicate hydrate crystals, which form the matrix of the board, can be controlled.

The autoclaving process 7 typically operates with a saturated steam pressure level at substantially 1000 KPa. The autoclaving time cycle is substantially 8 hours. The autoclaving process 7 includes the steps of, pressurising the autoclave chamber; holding the chamber at a pressurised level; and finally venting the chamber after the required time. During the process, the alkalinity of the water resistant fibre-cement product can be as high as a pH of 13. The water repelling agents herein described substantially withstand these harsh conditions maintaining water resistance in the water resistant fibre-cement product formed.

Finally the water resistant fibre-cement product produced is tested in a laboratory 8; trimmed to shape and inspected for imperfections 9; and dispatched 10.

It will be understood by persons skilled in the art that it is not essential for the fibre cement product to be autoclave cured. The water resistant fibre cement product may be air cured if desired.

Spray Application of Polymer Dispersions for the Manufacture of Water Resistant Fibre Cement.

Mixing

The solid polymer powder is dispersed in water using a high speed dispersion blade. The solids content of the dispersion is typically between 10 and 20% solids.

Spray Conditions

A spray bar was used with 4 to 6 jets, placed between 200 and 250 mm above the felt. The jets are a fan jet type with a nozzle aperture of 1 to 2 mm. The jets are arranged in two rows such that the spray pattern from the jets in one row just overlaps the spray pattern from those in the second row. The spray width is carefully controlled so that the off-cut from the width trimming operation contains as little polymer as is possible. The spray pressure is typically 1 to 2 bars gauge pressure. The spray flow rate is typically 600 to 800 litres per hour.

Spray Bar Positioning

The spray bar was situated above the felt after the last sieve roller. The felt carries the wet fibre cement film the length of the machine to the accumulation roller where it is rolled into the films already accumulated. When the desired thickness is achieved the wet board, or green sheet, is cut off and sent to the trimming section via belt conveyors.

Vacuum Box

During the transit time from the last sieve to the accumulation roller the polymer dispersion seeps through the wet film. At this point the film is typically 1.2 mm thick. Before the felt gets to the accumulation roller it passes over a vacuum box. This provides a dewatering effect that gives the film sufficient green strength to be transferred to the roller. The vacuum box also helps pull the polymer dispersion through the wet film, thus evening out the distribution of polymer across the film thickness.

Description 875 liters of water and the desired weight of polymer, eg 125 kg, are mixed together as a discrete batch in a high speed disperser, similar to those used in the paint and pharmaceutical industries. A variable speed pump circulates the dispersion around a ring main. A spray arrangement, as described above is connected in parallel with this ring main. When the polymer is required by the process a valve opens so that the ring man pressure is supplied to the spray nozzles. Excess flow returns to the buffer tank which supplies the pump.

Testing

The water resistance of fibre-cement products were measured by recording the drop in a water level of a water column having an initial height of 180 mm. The water column was marked with height measurements and rests on the fibre-cement product. In the tests conducted, the actual height of the water column was 180 mm. The water level drop was recorded before and after a 24 hour period.

The water column drop of an untreated exterior cladding fibre-cement product—standard Harditex exterior fibre-cement panel—over 24 hours was 75 mm. A water resistant fibre-cement product adapted for exterior use achieved a water column drop of between 5 mm and 30 mm over a 24 hour period. The water resistant fibre-cement product used in the test had 1% polymer based on the dry weight of fibre-cement. The water resistant product was made as for the standard Harditex exterior panel except that Vinnapas RI 554Z (available from Wacker Polymer) was sprayed on to the fibre-cement as discussed earlier herein. Vinnapas RI1554Z is a polyethylene, polyvinyl chloride, polyvinyl laurate terpolymer with silane functional groups.

Example of Water Permeability of a Harditex Board Treated During Production with Vinnapas RI 554Z

| | | Water column permeability, (cm/day) | |
|---|---|---|---|
| | Position in the | Position on the sheet | |
| Lift number | stack | Edge Perm | Centre Perm |
| 48116 | Top | 0.5 | 0.8 |
| 48117 | | 1.4 | 0.4 |
| 48118 | | 1.4 | 0.6 |
| 45740 | | 1.2 | 0.8 |
| | | 1.1 | 0.7 |
| 48116 | Middle | 0.1 | 0.3 |
| 48117 | | 0.3 | 0.3 |
| 48118 | | 0.2 | 0.1 |
| 45740 | | 0.7 | 0.4 |
| | | 0.3 | 0.3 |
| 48116 | Bottom | 1.4 | 0.5 |
| 48117 | | 0.1 | 0 |
| 48118 | | | 0.25 |
| 45740 | | 0.3 | 0.3 |
| | | 0.6 | 0.3 |

The Effect on Selected Physical Properties with varying Polymer Content

| Polymer [wt % of Vinnapas RI554Z] | Filtering Time At 20° | M.o.R. [Mpa] | Water Absorption (%) | Density (g/ml) | Permeability (cm drop per day) |
|---|---|---|---|---|---|
| CONTROL | 16.89 | 9.40 | 34.90 | 1.28 | 27.47 |
| 0.5 | 17.67 | 8.80 | 31.67 | 1.25 | 10.70 |
| 1 | 17.75 | 8.71 | 29.88 | 1.27 | 4.13 |
| 2 | 20.43 | 8.61 | 27.25 | 1.29 | 1.33 |
| 4 | 22.25 | 8.43 | 27.83 | 1.26 | 0.47 |

Notes:
These results are for material made in the lab by filter pad methods. The oreinted machine made material is substantially different in the actual values of the physical properties achieved. However the trend of the physical properties is consistent between the lab and machine based boards.
Filtering time: Increasing the polymer content increases filtering time. This puts a practical upper limit on use in a Hatscheck process. Limit yet to be defined.
Modulus of Rupture: Small but consistent decrease in MOR (flexural strength) as polymer content increases
Water absorption: The steady state water uptake is reduced as the polymer content is increased.
Density: The board density, (dry basis) is not influenced by polymer content.
Permeability: The water column permeability, (I.e the rate of water uptake) is significantly reduced as the polymer content is increased.

With reference to FIG. 2, a comparison of commercially available fibreboards is made with a product produced according to the present invention (Identified as Monotek (45979)–1.0% Vinnapas). As can clearly be seen, the Monotek product has superior abilities to resist water uptake as evidenced by reduced weight gain.

The use of the water repelling agents herein described demonstrate the ability to significantly reduce water permeability of fibre-cement products even other harsh autoclaving conditions. It will be appreciated that the water-resistant fibre cement product is not limited to use in wet areas but may be used in dry and wet areas.

Although the water resistant fibre-cement has been described with reference to the production of a water resistant fibre-cement board, tile and/or panel, it will be appreciated that this cement and technology may have broader applications to the construction industry.

Wherein the foregoing description reference has been made to elements or integers having known equivalents, then such equivalents are included as if individually set forth.

Although this invention has been described by way of example and with reference to particular embodiments, it is to be understood that modifications and/or improvements may be made without departing from the scope or spirit of the invention.

The invention claimed is:

1. The process for producing a water-resistant fibre-cement product, the process including using a terpolymer derived from ethylene, vinyl chloride, or vinyl laurate, in forming a fibre cement product wherein the terpolymer is integrally associated with the fibre-cement, and curing the product.

2. The process according to claim 1, wherein the product is cured at least partially by air curing.

3. The process as claimed in claim 1, wherein the product is at least partially cured by autoclaving.

4. The process according to claim 1, wherein the autoclaving process includes the use of saturated steam at pressure.

5. The process according to claim 1, wherein the autoclaving process is in an alkaline environment.

6. The process according to claim 1, wherein the saturated steam is at a pressure of about 1000 Kpa.

7. The process according to claim 1, wherein the alkaline environment is up to about pH 13.

8. The process according to claim 1, wherein the terpolymer is sprayed on to the fibre-cement during formation of the fibre-cement.

* * * * *